United States Patent Office 3,532,575
Patented Oct. 6, 1970

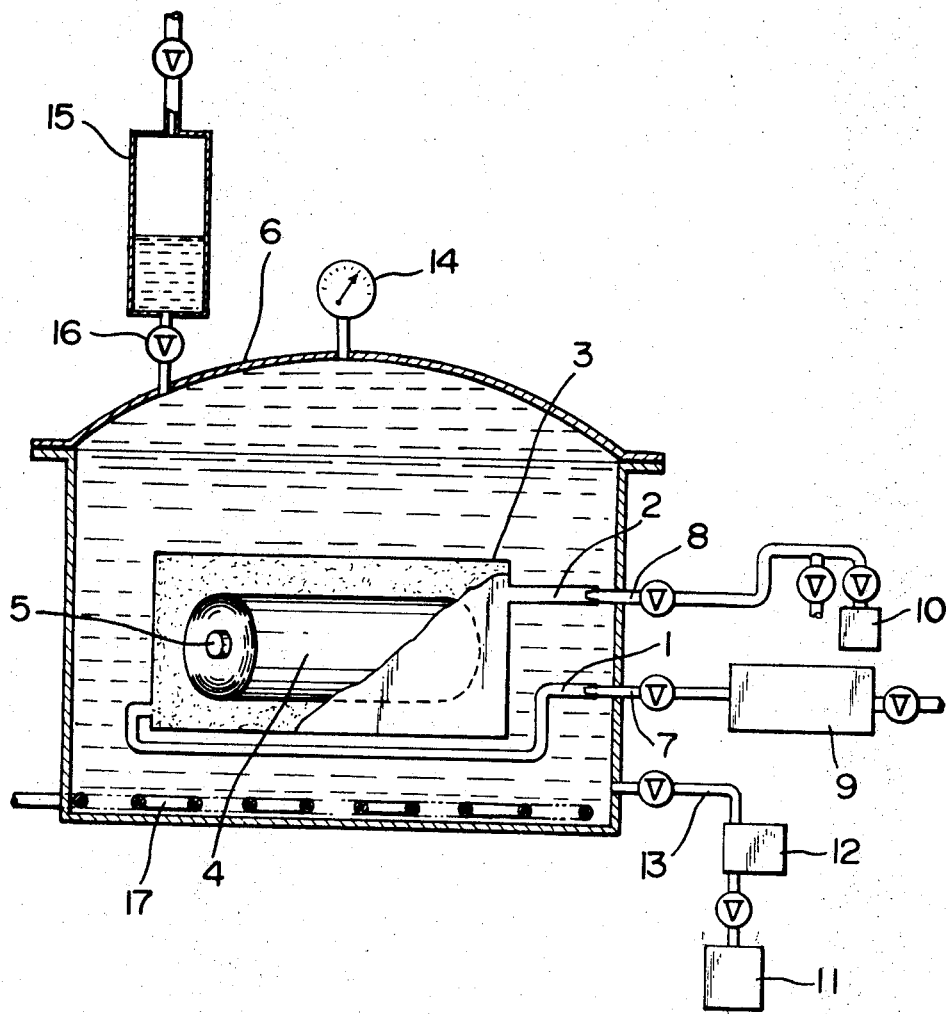

3,532,575
METHOD OF MANUFACTURING A LAMINATED MATERIAL FOR ELECTRICAL INSULATOR
Hideho Nagata and Masahiko Masuda, Chigasaki, Japan, assignors to The Furukawa Electric Company Limited, Tokyo, Japan
Filed Sept. 6, 1967, Ser. No. 665,801
Claims priority, application Japan, Sept. 12, 1966, 41/60,274
Int. Cl. B29c 17/00
U.S. Cl. 156—286                12 Claims

ABSTRACT OF THE DISCLOSURE

A method of manufacturing a laminated material for electrical insulator, free from voids or cracks and, therefore, having superior electrical properties, such as tubular insulator, condenser unit and condenser type bushing cone, etc., comprising in combination of steps of putting a rolled sheet filler in a bag made of thermoplastic synthetic resin and provided with at least two tubes, fixing the bag, which contains the rolled sheet filler, in a pressure vessel, evacuating the bag and supplying therein a liquid resin composition, pressurizing a liquid medium in the pressure vessel to impregnate the rolled sheet filler throughly with the resin, and curing it under heat and pressure.

---

The present invention relates to a method of manufacturing a laminated material for electrical insulator, such a tubular insulator, consdenser unit, condenser type bushing cone, etc.

The condenser unit or condenser type bushing cone consists of a sheet filler made of kraft paper or woven or unwoven cloth of a synthetic fibre, and an electric conductive film layer made of metal foil, which is formed into an integral unit with the aid of a thermosetting resin such as phenol resin used as an impregnating substance. Such condenser unit or condenser type bushing cone has heretofore been manufactured by the following two methods. The first method comprises impregnating the above kraft paper or woven or unwoven cloth with a liquid thermosetting resin, laminating or winding it into a laminated material of a desired form, and then curing it by heat under pressure. The second method comprises laminating or winding the above kraft paper or woven or unwoven cloth into a rolled sheet filler of a desired form, putting it in a mould vessel, evacuating and filling up the mould vessel with a liquid thermosetting resin, impregnating the rolled sheet filler with the resin, and then curing it by heat under pressure.

The first method has disadvantages that during the manufacture moisture present in the atmosphere is often absorbed into the laminated material and the air is liable to remain in it, which makes it difficult to obtain a laminated material having superior electric characteristics.

The second method makes use of a mould vessel and after evacuation thereof, a liquid thermosetting resin is fed therein and then the curing step is applied. It is thus possible to prevent the laminated material from absorbing moisture during the manufacture. The second method, however, has disadvantages that the pressure applied to impregnate the rolled sheet filler with liquid resin becomes non-uniform as the resin hardens so that uniform pressure cannot be maintained until the resin is gelled, resulting in non-uniform impregnation of the resin or in occurrence of internal stress in accordance with generation of heat and also of contraction of the resin when it is cured, which causes crack or abnormal deformation in the laminated material. Thus, it has not been possible to manufacture a tubular insulator a condenser or a condenser type bushing having superior electric characteristics.

The principal object of the invention is to obviate the above-mentioned disadvantages and provide a method of manufacuring laminated materials such as tubular insulator, condenser unit or condenser type bushing cone having superior electric characteristics.

A feature of the invention is to laminate or wind around a core many layers of the sheet filler into a roll of a desired form, put it in a bag made of thermoplastic synthetic resin and provided with at least two tubes, hermetically seal said bag and then fixing it in a pressure vessel filled up with a liquid medium used for pressurizing and heating, said tubes being connected with a resin supply means and a vacuum pump, respectively, evacuate said bag into a vacuum state and fill it with a liquid resin composition, supply additional liquid medium to said pressure vessel to maintain its pressure at 2–200 kg./cm.$^2$, preferably 2–50 kg./cm.$^2$, while heating said pressure vessel, impregnate said rolled sheet filler with said liquid resin composition, and finally cure said impregnated laminated material to form a tubular insulator, a condenser unit or a condenser type bushing cone. The above-mentioned method according to the invention has important advantages that a liquid medium subjected beforehand to the degassing treatment may be used as the liquid medium to be supplied into the pressure vessel with the result that gas is not penetrated from the liquid medium into the liquid resin composition in the bag, and that the step of impregnating the rolled sheet filler with the liquid resin composition at a high temperature under a high pressure is capable of impregnating a sufficient amount of the liquid resin composition into the rolled sheet filler in an extremely short time. Moreover, the method according to the invention permits of applying uniform pressure upon the total outside surface of the rolled sheet filler until the resin impregnated becomes gelled thus preventing contraction caused by gellation of the resin and occurrence of internal stress due to generation of heat and hence preventing crack or abnormal deformation in the laminated material. The laminated material thus obtained is free from any void or crack and has superior electric characteristics, particularly a remarkably high corona starting voltage.

The said bag must be made of thermoplastic resin with high flexibility, suitable elongation, and little air permeability that can be sealed by heating or bonded easily with adhesive. Examples of such thermoplastic synthetic resin are polyvinyl chloride, polyvinylidene chloride, polyethylene, polypropylene, etc.

As the liquid medium to be supplied into the pressure vessel may be used any liquid substance which is liquid state at room temperature and does not give any bad influence upon the laminated material or deteriorate the bag. Examples of such pressure liquid medium are mineral oil, polyglycols such as ethyleneglycol and glycelene, polybutene, and aromatic hydrocarbons.

Impregnation of rolled sheet filler with the liquid resin composition and subsequent curing of the impregnated laminated material may most preferably be carried out by the following steps. At first, the pressure in the pressure vessel is made 2–50 kg./cm.$^2$ by means of the liquid medium while the temperature of the liquid medium is gradually increased from room temperature to a temperature lower than 70° C. Sufficient impregnation of rolled sheet filler with the liquid resin composition is ascertained with the aid of a pressure gauge or a pressure liquid medium level indicator connected to the pressure vessel. Subsequently, surplus resin in the bag is removed out of the bag and then the temperature of the liquid medium is raised to a temperature lower than 160° C. to cure the resin.

As the liquid resin composition may be used any resin composition containing no solvent which is liquid at room temperature and which is cured by heating. Examples of such resin composition are a liquid epoxy type resin composition containing no solvent and consisting of epoxy resin which is liquid at room temperature and an organic acid anhydride or an amine compound used as a hardening agent, and an unsaturated polyester type resin composition containing no solvent and consisting of an unsaturated polyester resin which is liquid at room temperature, a vinylmonomer, and an organic peroxide.

The method according to the invention makes it possible to provide a tubular insulator with no void or crack, using, for example, the rolled sheet filler made of woven or nonwoven cloth of synthetic fiber and/or creped or non-creped kraft paper and also provide a condenser unit or condenser type bushing cone having a remarkably high corona starting voltage, using, for example, the rolled sheet filler made of woven and non-woven cloth of synthetic fiber or creped or non-creped kraft paper, and a metal foil or conductive film layer inserted between adjacent insulating layers, said conductive film being formed by depositing metal from phase onto the woven or non-woven cloth and said rolled sheet filler being wound on a hollow or solid conductor.

For better understanding of the invention, examples of the method according to the invention will be explained with reference to the accompanying drawing, of which a single figure is a diagrammatic illustration of a device for carrying out the invention into effect.

EXAMPLE 1

A sheet of polyvinylidene chloride having a thickness of 0.5 mm. was provided with two tubes 1 and 2 made of polyvinyl chloride, each having an inner diameter of 8 mm. and a thickness of 1 mm., in such a manner that they are passed through two holes made on the edge portion of the sheet. The tubes 1 and 2 were heat welded to the sheet. To this sheet was heat-sealed another sheet at all edges, except one edge left unsealed for opening, to form a bag 3. In the bag 3 was put through the opening a rolled sheet filler 4 having an outer diameter of 75 mm. and an apparent volume 3 liters, made of woven cloth of polyethylene terephthalate fibre having a thickness of 0.35 mm. and containing a stainless steel rod 5 having an outer diameter of 35 mm. Then, the opening of the bag 3 was sealed by heating. The thus formed bag 3 was fixed in a pressure vessel 6 and the tubes 1 and 2 were connected to an impregnating resin supply conduit 7 and an evacuating conduit 8, respectively. These conduits 7 and 8 were connected with a resin composition supply tank 9 and a vacuum pump 10, respectively, fixed outside the pressure vessel 6.

Then, a pressure liquid medium such as ethylene glycol was supplied from a supply tank 11 through an oil pump 12 and conduit 13 into the pressure vessel 6 until the vessel was filled up. Subsequently, the vacuum pump 10 was operated to reduce the pressure in the bag 3 to 0.3 mm. Hg. Then, 5 liters of liquid epoxy resin composition maintained at a temperature of 40° C. was supplied from the tank 9 through the conduit 7 and the tube 1 into the evacuated bag 3.

The liquid epoxy resin composition was prepared by mixing 100 parts by weight of liquid epoxy resin (Araldite GY 250), 80 parts by weight of hardener, (methylnadic-anhydride) and 1 part by weight of benzyldimethylamine as an accelerator and subjected beforehand to a degassing treatment under a pressure lower than 0.1 mm. Hg. and maintained at 40° C. The pressure for supplying the resin is gradually increased until a pressure gauge 14 does not drop its indication even when a valve provided in the conduit 7 is closed. This condition was kept for about 3 hours. Thereafter, the pressure within the pressure vessel 6 was increased to 2–7 kg./cm.$^2$ by means of the oil pump 12 and after about 2 hours increased to 25 kg./cm.$^2$. After about 12 hours, the pressure and temperature of ethylene glycol were increased to 50 kg./cm.$^2$ and 140° C., respectively, to cure the rolled sheet filler 4. This condition was maintained for about 12 hours to sufficiently cure it.

Subsequently, the bag 3 was taken out of the pressure vessel 6 and the bag 3 was stripped off from the impregnated rolled sheet filler 4 while the rod 5 was removed from said filler 4 to obtain a tubular insulator having a thickness of 20 mm. and free from any void or crack.

EXAMPLE 2

A sheet of polyethylene having a thickness of 0.5 mm. was provided with two tubes 1 and 2 made of polyethylene, each having an inner diameter of 8 mm. and a thickness of 0.5 mm., in such a manner that they are passed through two holes made on the edge portion of the sheet. The tubes 1 and 2 were heat-welded to the sheet. To this sheet was heat-sealed another sheet at all edges, except one edge left unsealed for opening to form a bag 3.

In a bag 3 was put through the opening a rolled sheet filler 4 having an apparent volume of 4 liters. In the present example the rolled sheet filler containing 7 turns of creped kraft paper having a thickness of 0.25 mm., one turn of unwoven cloth of polyethylene terephthalate covered with a zinc metal vapour deposited thereon and having a thickness of 0.02 mm., with these turns being wound successively around the square section of 30 x 60 mm. iron rod 5. Then the opening of the bag was sealed by heating.

Thereafter, the bag 3 was fixed in the pressure vessel 6 and the tubes 1 and 2 were connected to the impregnating resin supply conduit 7 and the evacuation conduit 8, respectively. These conduits 7 and 8 were connected with with the resin composition supply tank 9 and the vacuum pump 10, respectively, fixed outside the pressure vessel 6. Thereafter, mineral oil having a viscosity of 30 centistokes at 25° C. was supplied from the tank 11 through the oil pump 12 and the conduit 13 into the pressure vessel 6 until the vessel was filled up. Then, the pressure within the bag 3 and the pressure vessel 6 were reduced to 0.05 mm. Hg by means of the vacuum pump. Subsequently, 3 liters of liquid unsaturated polyester resin composition maintained at a temperature of 30° C. was supplied from the tank 9 through the conduit 7 and tube 1 into the evacuated bag 3. The liquid unsaturated polyester resin was prepared by mixing 100 parts by weight of liquid unsaturated polyester resin (Epocryl E–11) and 2.5 parts by weight of a mixture of methyl ethyl ketone peroxide and cobalt-naphthenate (mixing ratio 4/1) and subjected beforehand to the degassing treatment under a pressure lower than 7 mm. Hg. Then, the liquid medium overflow into the level tank 15 was fed back under pressure into the pressure vessel 6 to impregnate the resin around the rolled sheet filler 4 into the latter. Then the pressure within the pressure vessel 6 was increased to 2–7 kg./cm.$^2$. After about 3 hours and after it was ascertained that the level of pressure medium within the level bottle 15 was not changed and the deflection of the pressure gauge 14 was not changed when the valve was closed, the pressure within the pressure vessel 6 was raised to 13 kg./cm.$^2$ by means of the pump 11. The surplus resin composition in the bag 3 was fed back through the tube 1 and the conduit 7 into the tank 9 and then the temperature of the presure medium was increased to 70° C. by means of the pipe heater 17 while the pressure within the pressure vessel 6 was increased further to 200 kg./cm.$^2$ by means of the oil pump 12 and this condition was maintained for about 12 hours.

After about 12 hours, the bag 3 was taken out of the pressure vessel 6 and stripped off from the impregnated rolled sheet filler 4 while the rod 5 was removed from said filler 4 to obtain a condenser unit having no void or crack.

Ten of the thus obtained condenser units were assembled in a casing to form a 6 kv. condenser whose corona starting voltage was higher than 18 kv. which was remarkably higher than that of a condenser manufactured by the conventional method thus ensuring a safe operation.

EXAMPLE 3

A sheet of polypropylene mixture having a thickness of 0.3 mm. was provided with two tubes 1 and 2 made of polypropylene mixture, each having an inner diameter of 7 mm. and a thickness of 0.3 mm., in such a manner that they are passed through two holes made on the edge portion of the sheet. The tubes 1 and 2 were heat-welded to the sheet. To this sheet was heat-sealed another sheet at all edges, except one edge left unsealed for opening to form a bag 3.

In the bag 3 was put through the opening a rolled sheet filler 4 having an apparent volume of 5 liters. In the present example, the rolled sheet filler containing 10 turns of unwoven cloth of polyamide each turn having a thickness of 0.30 mm. and having a thickness of 3.5 mm. and wound around the center conductor 5 made of copper rod while bonding on each turn a mixture of 100 parts by weight of liquid epoxy resin. (Epkote 828) and 20 parts by weight of benzyldimethylamine. Such covered conductor 5 was left as it was at room temperature for 5 hours and then wound around it 10 turns of unwoven cloth of polyethyleneterephthalate fibre having a thickness of 0.13 mm. and further wound one layer of aluminum foil having a thickness of 0.01 mm. Such winding operations were repeated and the final aluminum foil was wound by 15 turns of non-fabric of the same unwoven cloth of polyethyleneterephthalate fibre. The thus formed rolled sheet filler 4 to be impregnated having an apparent volume 5 liters was inserted through the opening into the bag 3 and then the opening was sealed by heating.

Thereafter, the bag 3 was arranged in the pressure vessel 6 and the tubes 1 and 2 were connected to the conduits 7 and 8 connected with the tank 9 and the vacuum pump 10, respectively, fixed outside the pressure vessel 6.

Then, polybutene subjected beforehand to the degassing treatment and having a viscosity of 30 cs. at 40° C. was supplied from the tank 11 through the oil pump 12 and the conduit 13 into the pressure vessel 6 until the vessel was filled up. Then, the vacuum pump 10 was operated to reduce the pressure in the bag 3 to 0.1 mm. Hg. Subsequently, 6 liters of liquid epoxy resin composition maintained at a temperature of 45° C. was supplied from the tank 9 through the conduit 7 and tube 1 into the evacuated bag 3. This liquid epoxy resin composition was prepared by mixing 100 parts by weight of liquid epoxy resin (Araldite CT 205), 100 parts by weight of a mixed organic acid anhydride (Aralelite Hardner HY–905), and 0.5 part by weight of benzyldimethylamine and subjected beforehand to the degassing treatment under a pressure lower than 0.2 mm. Hg. Then, the pressure within the pressure vessel 6 was increased to 2–7 kg./cm.² by means of the oil pump 12 to impregnate the liquid resin composition into the rolled sheet filler 4. After about 5 hours and after it was ascertained that the deflection of the pressure gauge 14 when the valve provided in the conduit 13 was closed and the level of the pressure medium within the level bottle 15 were not changed even when the valve 16 was opened, the pressure of the pressure medium within the pressure vessel 6 was raised to 15 kg./cm.². The surplus resin composition in the bag 3 was fed back through the tube 1 and the conduit 7 into the tank 9 and then the temperature of the pressure medium was increased to 60° C. by means of the pipe heater 17 and this condition was maintained for about 7 hours. After about 7 hours the pressure and the temperature of the pressure medium were increased to 20 kg./cm.² and 130° C., respectively. This condition was maintained for about 8 hours to sufficiently cure the impregnated roller sheet filler 4.

Thereafter, the bag 3 was taken out of the pressure vessel 6 and stripped off from the impregnated rolled sheet filler 4 to obtain a condenser cone.

The thus obtained condenser cone was assembled together with a support flange, an insulator, metal fittings and terminals into a 30 kv. dry condenser type bushing whose measured corona starting voltage was higher than 46 kv. which was comparatively higher than the corona starting voltage of 25 kv. of a dry condenser type busing manufactured by the conventional method thus ensuring a safe operation.

EXAMPLE 4

A sheet of polyvinyl chloride having a thickness of 0.3 mm. was provided with two tubes 1 and 2 made of polyvinyl chloride, each having an inner diameter of 10 mm. and a thickness of 0.5 mm. in such a manner that they are passed through two holes made on the edge portion of the sheet. The tubes 1 and 2 were high frequency welded to the sheet. To this sheet was heat-sealed another sheet of polyvinyl chloride at all edges except one edge left unsealed for opening to form a bag 3.

In the bag 3 was put through the opening a rolled sheet filler 4. The rolled sheet filler 4 in the present example includes a copper pipe 5 having an outer diameter of 46 mm. and laminated layers which were formed as follows. The copper pipe 5 was bonded with a thermosetting resin composition prepared by mixing 100 parts by weight of liquid epoxy resin (Epikote 828) and 50 parts by weight of low molecular polyamide resin (Varsamid 115) while on this coated copper pipe 5 was wound 10 turns of unwoven cloth of polyamide each turn having a thickness of 0.3 mm. and then the assembly was left as it was at room temperature for about 5 hours to cure it. This copper pipe was wound by 6 turns of unwoven cloth of polyethylene terephthalate fibre each turn having a thickness of 0.13 mm., one turn of aluminium foil having a thickness of 0.03 mm., 6 turns of the above-mentioned unwoven cloth and further 8 turns of kraft paper each turn having a thickness of 0.25 mm. thus forming the above mentioned laminated layers. Then, a rod-shaped electric heater (not shown) was inserted into the copper pipe core 5 and the pipe ends were heat sealed. The lead wires of the heater (not shown) were extended through the tube 2 and connected to an electric supply source (not shown) provided outside the pressure vessel 6. The thus formed rolled sheet filler 4 was put through the opening into the bag 3 and then the opening was sealed with polyvinyl chloride resin adhesive.

Thereafter, the bag 3 was fixed in the pressure vessel 6 and the tubes 1 and 2 were connected to the conduits 7 and 8 connected with the tank 9 and the vacuum pump 10, respectively, fixed outside the pressure vessel 6.

Then, mineral oil subjected beforehand to the degassing treatment and having a viscosity of 100 cs. at 45° C. was supplied from the tank 11 through the oil pump 12 and the conduit 13 into the pressure vessel 6 until the vessel was filled up. Then, the vacuum pump 10 was operated to reduce the pressure in the bag 3 to 0.03 mm. Hg. Subsequently, 10 liters of liquid epoxy resin composition maintained at 45° C. was supplied from the tank 9 through the conduit 7 and the tube 1 into the evacuated bag 3. This epoxy resin composition was prepared by mixing 100 parts by weight of liquid epoxy resin (Araldite GY 250), 100 parts by weight of a mixture of hexahydrophthalic anhydride and chlorendic anhydride (mixed ratio of 1:1), and 2 parts by weight of benzyldimethylamine and subjected beforehand to the degassing treatment under a pressure of 0.1 mm. Hg. Then, the pressure within the pressure vessel 6 was increased to 2–7 kg./cm.² by means of the oil pump 12 to impregnate the liquid resin composition into the rolled sheet filler 4. After about 5 hours and after it was ascertained that the deflection of the pressure gauge 14 when the valve provided in the conduit 13 was closed and the level of the pressure medium within the level bottle 15 were not changed even when the valve 16 was opened, the pressure of the pressure medium within the pressure vessel 6 was raised to 15 kg./cm.$^2$. The surplus resin composition in the bag 3 was fed back through the pipe 1 and the conduit 7 into the tank 9 and then the heater temperature was increased to 70° C. while the temperature of the pressure medium was increased to 60° C. by means of the pipe heater 17 and this condition was maintained for about 12 hours.

After about 12 hours, the pressure and the temperature of the pressure medium were increased to 15 kg./cm.$^2$ and 120° C., respectively. This condition was maintained for about 10 hours to sufficiently cure the impregnated rolled sheet filler 4.

Thereafter, the bag 3 was taken out of the pressure vessel 6 and stripped off from the impregnated rolled sheet filler 4 with the electric heater being removed from the center conductor.

The dry condenser type bushing cone thus obtained and having an outer diameter of 115 mm. had no void or crack and was assembled together with a support flange, an insulator, metal fittings and terminals into a 69 kv. dry condenser type bushing whose measured corona starting voltage was higher than 80 kv. which was comparatively higher than the corona starting voltage of 46 kv. of a dry condenser type bushing manufactured by the conventional method thus ensuring a safety operation for a longer period.

What we claim is:

1. A method of manufacturing a laminated material, comprising steps of putting a rolled sheet filler in a bag made of a thermoplastic synthetic resin and provided with one or more tubes, hermetically sealing said bag and then fixing it in a pressure vessel, said tubes being connected to a resin supply tank and a vacuum pump, respectively, filling said vessel with a pressure liquid medium, evacuating said bag into a vacuum state, supplying a liquid resin composition into said evacuated bag until the bag is filled up with the liquid resin composition, supplying additional liquid medium into said pressure vessel to impregnate said rolled sheet filler with said liquid resin composition, and finally heating said bag under such pressure that no surplus resin remains in said bag to cure said impregnated filler thus forming a laminated material.

2. A method according to claim 1, wherein said bag is made of a thermoplastic synthetic resin such as polyvinyl chloride, polyvinylidene chloride, polyethylene, and polypropylene.

3. A method according to claim 1, wherein said pressure liquid medium to be supplied into said pressure vessel is liquid state at room temperature and is mineral oil, polyglycols, polybutene, and aromatic hydrocarbons.

4. A method according to claim 1, wherein said liquid resin composition is a liquid epoxy type resin composition without containing solvent but containing epoxy resin which is liquid at room temperature and an organic acid anhydride or an amine compound used as a hardening agent; a liquid unsaturated polyester type resin composition without containing solvent but containing an unsaturated polyester resin which is fluid at room temperature, a vinyl monomer and an organic peroxide.

5. A method according to claim 1, wherein the rolled sheet filler is impregnated with the liquid resin composition at a temperature from room temperature to a temperature less than 70° C. under a pressure of 2–200 kg./cm.$^2$, preferably 2–50 kg./cm.$^2$ and then the impregnated laminated material is cured at a temperature lower than 160° C.

6. A method according to claim 1, wherein said rolled sheet filler includes a core and (1) woven or unwoven cloth of synthetic fibre, (2) crepe or non-crepe kraft paper or (3) said cloth and kraft paper.

7. A method according to claim 1, wherein said rolled sheet filler includes a core and (1) woven or unwoven cloth of synthetic fibre, (2) crepe or non-crepe kraft paper, or (3) said cloth and kraft paper with metal foil or woven or unwoven of synthetic fibre deposited with metal from vapour phase.

8. A method according to claim 1, wherein said rolled sheet filler includes a hollow or solid conductor wound successively around it by smooth kraft paper or crepe kraft paper and inserted therein a thin electric conductive layer made of metal foil, or woven or unwoven cloth of synthetic fibre deposited with metal from vapour phase.

9. A method according to claim 1, wherein said rolled sheet filler includes a hollow or solid conductor wound successively around it by synthetic woven or unwoven cloth layer and inserted therein a thin electric conductive layer made of metal foil or woven or unwoven cloth of synthetic fibre deposited with metal from vapour phase.

10. A method according to claim 1, wherein said rolled sheet filler includes a hollow or solid conductor and a laminated layer including one or more substances made of woven or unwoven cloth of synthetic fibre or crepe or non-crepe kraft paper and an electric conductive thin film layer spaced from said substrates and made of a metal foil, woven or unwoven cloth of synthetic fibre deposited with metal from vapour phase.

11. A method according to claim 1, wherein said rolled sheet filler includes a hollow or solid conductor, an inner layer of woven or unwoven cloth of synthetic fibre impregnated with a liquid resin containing excessive reaction accelerator, and an outer layer of one or more substrates of woven or unwoven cloth of synthetic fibre, crepe or non-crepe kraft paper, said outer layer including therein at spaced relation an electric conductive thin film layer of a metal foil or metal-coated woven or unwoven cloth of synthetic fibre deposited with metal from the vapour phase.

12. A method according to claim 1, wherein said rolled sheet filler includes a hollow conductor enclosing therein a heat supply source communicated with the exterior part and adapted to heat the inner part of said hollow conductor to accelerate the heat hardening reaction.

References Cited
UNITED STATES PATENTS

| | | | |
|---|---|---|---|
| 1,594,124 | 12/1920 | Shrader | 156—285 |
| 1,595,811 | 8/1926 | Anderson | 156—184 |
| 2,684,317 | 10/1950 | Burnham | 156—184 |

BENJAMIN R. PADGETT, Primary Examiner

G. G. SOLYST, Assistant Examiner

U.S. Cl. X.R.

156—48, 184